United States Patent Office 3,073,174
Patented Jan. 15, 1963

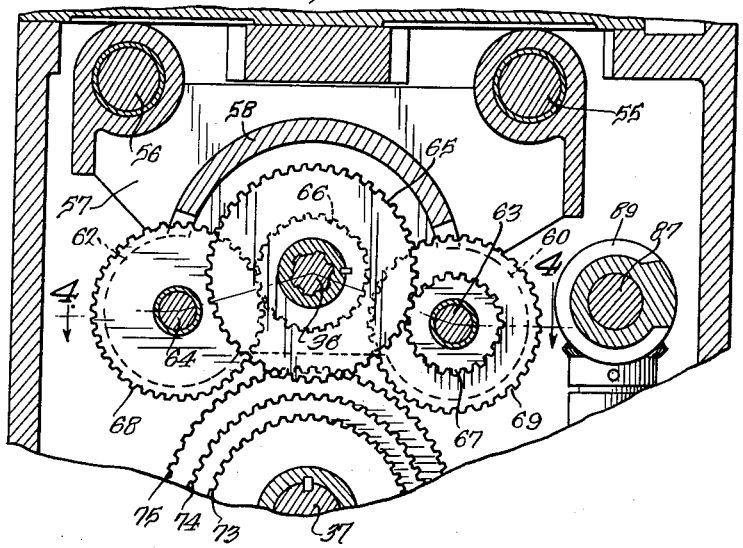

3,073,174
MULTI-SPEED TRANSMISSION
Fred R. Swanson, Rockford, and Carl F. Erikson, Belvidere, Ill., assignors to Sundstrand Corporation, a corporation of Illinois
Original application Feb. 13, 1958, Ser. No. 715,109. Divided and this application Mar. 21, 1960, Ser. No. 16,589
4 Claims. (Cl. 74—354)

This invention relates to a machine tool transmission and more particularly to a multi-speed transmission for mounting on a movable machine tool head.

This application is a division of our copending application Serial No. 715,109, filed February 13, 1958.

An object of this invention is to provide a new and improved multi-speed machine tool transmission.

Another object of this invention is to provide a multi-speed transmission which has a compact construction adaptable for mounting on a movable machine tool head, such as on a milling machine while still providing for a wide variety of speeds in both high and low ranges.

A further object of the invention is to provide a multi-speed transmission, comprising: a first shaft having a plurality of different sized output gears; a second shaft in spaced relation with said first shaft having a plurality of drive gears; at least one pair of intermediate gears, means mounting said pair of intermediate gears, one each on opposite sides of said second shaft and in mesh with said drive gears to provide a stepped-up rotation in one intermediate gear and a stepped-down rotation in the other intermediate gear, said means being pivotal about said second shaft in an arc concentric thereto and in a direction either clockwise or counterclockwise, means for movably adjusting said mounting means to align one of said intermediate gears with one of said output gears, and means for pivoting said mounting means about said second shaft.

Further objects and advantages will become apparent from the following detailed description taken in connection with the accompanying drawings in which:

FIG. 3 is a vertical section through the multi-speed transmission taken generally along the line 3—3 in FIG. 1; and FIG. 4 is a plan section taken generally along the line 4—4 in FIG. 3.

Figure 1:
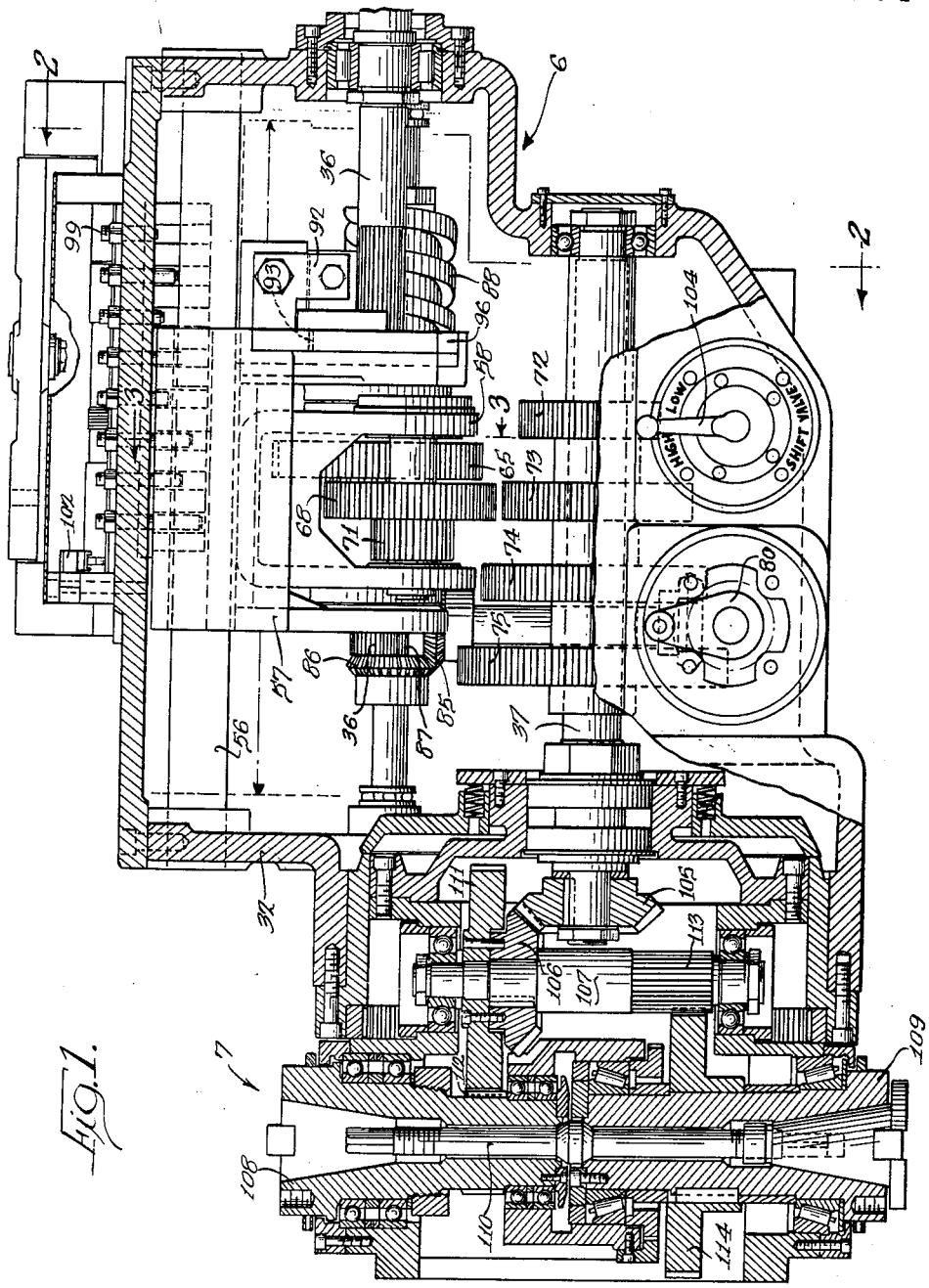
FIG. 1 is a vertical section through the transmission and spindle heads of a milling machine.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The preferred embodiment of the invention, as herein shown, is adapted to be used with a bed-type milling machine tool. The multi-speed transmission is carried by a movable transmission head mounting a spindle head forming a universal head and power unit.

The multi-speed transmission within the transmission head housing 32 is shown particularly in FIGS. 1, 2, 3 and 4. This transmission includes the input shaft 36 and the output shaft 37. A pair of rods 55 and 56 are mounted in the housing 32 and extend parallel to the input shaft 36 to slidably mount a frame 57 and a rocker frame 58 is mounted on the slidable frame 57 for rocking movement about the input shaft 36. The rocker frame 58 has a pair of spaced arms 59 and 60 extending to one side of the input shaft 36 and a second pair of arms 61 and 62 extending to the other side of the input shaft 36. The arms 59 and 60 rotatably mount a stub shaft 63 and the arms 61 and 62 rotatably mount a stub shaft 64. A pair of gears 65 and 66 are secured to a sleeve 66a which is slidable on input shaft 36 and keyed thereto. The sleeve 66a is rotatably mounted in rocker frame 58 by bearings 66b and 66c and also functions to support the input shaft 36 confined within the rocker. The gear 65 meshes with a gear 67 having a lesser number of teeth to form a step-up drive for the stub shaft 63 while the gear 66 meshes with a gear 68 having a larger number of teeth to form a step-down speed connection for the stub shaft 64. In addition to the gear 67 the stub shaft 63 also has gears 69 and 70. In addition to gear 68 the stub shaft 64 has a gear 71. The gears 70, 71 have an equal number of teeth as do the gears 68, 69.

The output shaft 37 has a cluster of different diameter output gears 72, 73, 74 and 75 with varying numbers of teeth and is located generally beneath the input shaft 36. The slidable frame 57 is moved to align either of the gears 68 and 69 with one of the gears on the output shaft or to align one of the gears 70 and 71 on the rocker frame with a gear on the output shaft 37. At this point the transmission is set to provide either of two speeds to the output shaft 37. The rocker frame 58 is then pivoted about the input shaft 36 to mesh one or the other of the gears on the rocker frame with an output gear dependent upon the direction of pivoting of the rocker frame 58. If the rocker frame pivots clockwise, as shown in FIG. 3, the output shaft, as a result, will be driven at the higher of the two possible speeds. If the rocker frame pivots counterclockwise, the output shaft will be driven at the lower of the two speeds.

Means for shifting the slidable frame 57 along the rods 55 and 56 comprises a handle 80, a shaft 81, bevel gears 82 and 83, a vertically extending shaft 84 and bevel gears 85 and 86. The bevel gear 86 is secured to a rotatably mounted shaft 87 carrying a spiral cam 88 arranged to have eight longitudinally spaced dwell positions for a cam follower 89 fastened to the slidable frame 57. Each revolution of the spiral cam 88 will shift the slidable frame 57 the distance of one dwell in the spiral cam to shift the alignment of a gear on the rocker frame with the output gears. With a total of four output gears there are eight positions of the slidable frame 57 to align either of the two gears on the rocker frame with the output gears.

Figure 2:
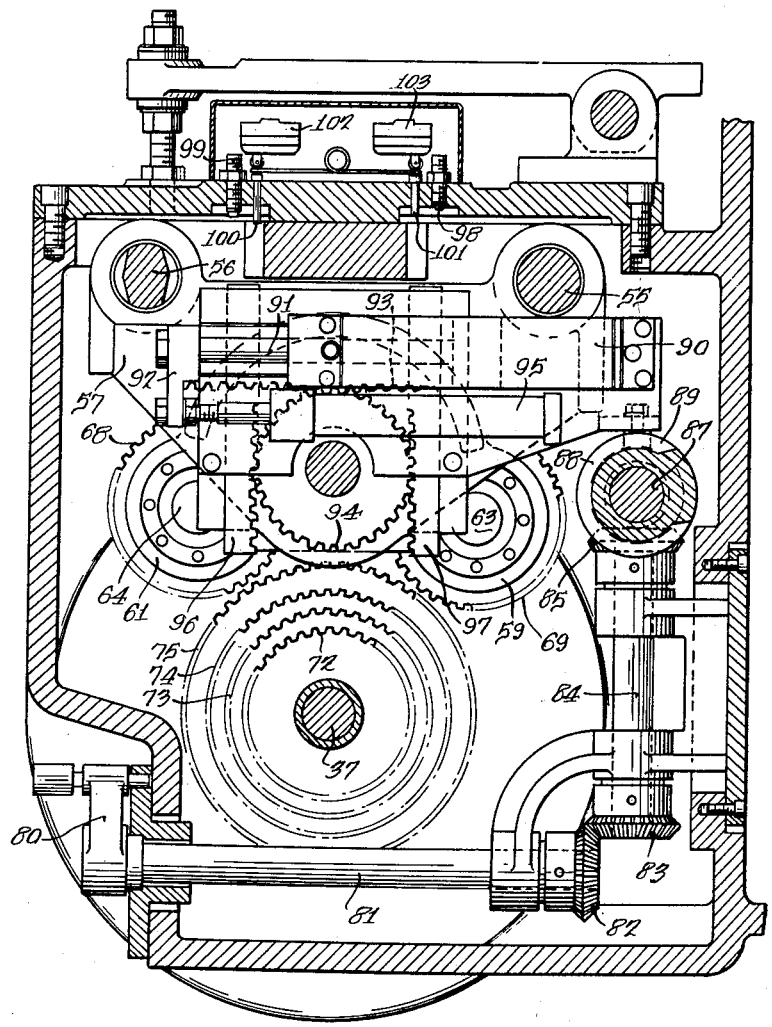
FIG. 2 is a vertical section on an enlarged scale through the transmission head taken generally along the line 2—2 in FIG. 1.

Means are provided for pivoting the rocker frame 58 in a counterclockwise direction for a high speed drive as viewed in FIG. 2 or for shifting the rocker frame clockwise to provide for a low speed drive. This means includes a hydraulic cylinder 90 having a piston rod 91 connected to a member 92 carrying a rack 93 engageable with a gear 94 fixed to the rocker frame 58 whereby movement of the rack will rotate the gear 94 and the rocker frame 58. A suitable spring mechanism is mounted within housing 95 for returning the rocker frame 58 to the neutral position shown in FIG. 2 when pressure is released from the hydraulic cylinder 90. The gear 94 also engages a pair of slidably mounted racks 96 and 97 at opposite sides thereof and arranged to travel in opposite directions. A series of stops 98, 99, are mounted in the top of transmission housing 32 and positioned properly to engage the racks 97 and 96, respectively, to limit the pivoting movement of the rocker frame 58. As shown in FIG. 2, if the rocker frame is pivoted clockwise, the rack 96 will rise into engagement with the stop 99 to limit the pivoting movement of the rocker frame. If the rocker frame is moved in the opposite direction, the rack 97 will function with the stop 98. The racks 96 and 97 also function with switch operating plungers 100 and 101 to operate the switches 102 and 103 to detect completion of the pivoting movement of the rocker frame and the fact that gears are in mesh.

As shown in FIG. 1, a control handle 104 is mounted on the transmission head to control the operation of the hydraulic cylinder 90 through a circuit (not shown).

The output shaft 37 of the transmission head also constitutes an input shaft for the spindle head 7 and carries beveled gear 105 on an end thereof which meshes with a bevel gear 106 fixed to a rotatably mounted stub shaft 107. The spindle head 7 has a high speed spindle 108 and a low speed spindle 109 extending from opposite ends thereof. The high speed spindle is supported by ball bearings to provide the relatively loose spindle mounting required for high speed operation while the low speed spindle is supported by roller bearings to provide a relatively tight mounting of the spindle as required for low speed operation. A common draw bar 110 is provided for both spindles. The high speed spindle is driven from the stub shaft 107 by meshing step-up gears 111 and 112 and the low speed spindle 109 is driven by meshing step-down gears 113 and 114.

The machine as described herein results in the universal mounting of spindle head so as to present either spindle at any desired angle relative to a workpiece wherein the usable area of the table remains the same regardless of the choice of spindle. The spindle head 7 is mounted on a sturdy base including the transmission head 6 which is arranged to include a multi-speed transmission and also support the drive motor to provide a rigid support for the spindle head 7. The multi-speed transmission provides for a low range and a high range of speeds for the spindles 108 and 109 and is shown with a total of eleven gears and no clutches. The output shaft 37 is given a range of sixteen speeds. The arrangement of a high speed spindle 108 and a low speed spindle 109 in the spindle head 7 provides for a high-speed and low-speed ratio therebetween and each of the spindles has a total of sixteen speeds by the particular transmission disclosed herein. The use of two spindles provides for a maximum range of speeds at maximum torque. As an example, the milling machine disclosed herein may have a range of speeds encountered in machining of air frame parts which varies from the low speed required for high tensile steel or titanium to the high speed required for aluminum and magnesium. The use of two spindles also enables the use of proper bearings for each of the spindles in its speed range, and makes possible maximum torque and minimum gear speed through the gear train.

We claim:

1. A multi-speed transmission for a milling machine or the like comprising, in combination, an input shaft, an output shaft in spaced parallel relation with said input shaft, a plurality of spaced apart output gears of different diameter on said output shaft, a slidable frame, means mounting said slidable frame for movement lengthwise of the output shaft, a rocker frame pivotally mounted on said slidable frame and about said input shaft, a pair of stub shafts carried by said rocker frame with one on each side of the input shaft, a pair of drive gears splined on said input shaft and operably associated with said slidable frame for movement therewith, a pair of intermediate gears of different diameters closely adjacent each other on each of said stub shafts operatively connected to said drive gears to have one stub shaft rotate at one speed and the other stub shaft rotate at a different speed, the space between gears on said output shaft being of a width sufficient to receive the larger of said intermediate gears, means for shifting said slidable frame and rocker frame along the input shaft to align an intermediate gear of each pair with one of said output gears to provide for two different output speeds, and means for pivoting the rocker frame selectively in either direction about the input shaft to mesh either a gear of the one stub shaft or a gear of the other stub shaft with said one output gear to provide different speeds for said output shaft with the travel of the rocker frame being variable dependent upon the diameter ratio of the gears being brought into mesh.

2. A machine tool comprising, in combination, a first drive shaft, a second driven shaft in spaced relation with said first shaft, a plurality of spaced apart gears of different diameter on said second shaft, a rocker frame mounted for pivotal movement about said first shaft, a stub shaft carried by said rocker frame to one side of the first shaft, a gear splined on said first shaft and slidable thereon, a pair of intermediate gears of different diameter closely adjacent each other on said stub shaft and operatively connected to said first shaft gear, the space between gears on said second shaft being of a width sufficient to receive the larger of said intermediate gears, means for moving said rocker frame and said splined gear lengthwise relative to said second shaft to align an intermediate gear with one of said gears on the second shaft, and means for pivoting the rocker frame about the first shaft to mesh the aligned intermediate gear with said gear on the second shaft with the travel of the rocker frame being variable dependent upon the diameter ratio of the gears being brought into mesh.

3. A machine tool as defined in claim 2, wherein the means for shifting the rocker frame includes a cam follower operatively connected to the rocker frame, a rotatable spiral cam having a plurality of dwell positions along its length engageable by the follower during each revolution of the cam whereby an intermediate gear is lined up with a gear on the second shaft, manually operable means for rotating the cam, said means for pivoting the rocker frame including a gear fixed to the rocker frame in axial alignment with said first shaft, a rack engageable with said gear, and means for moving said rack.

4. A multi-speed gear transmission having two shafts in spaced parallel relation, the first shaft supporting one or more spaced apart gears, a rocker frame pivoted about the second shaft, said rocker having means defining at least two axes of rotation offset from the second shaft and plurality of intermediate gears mounted for rotation on each axis and driven by said second shaft, said rocker and gears on the first shaft being relatively movable one with respect to the other to align an intermediate gear on either axis of rotation with a gear on the first shaft, means for pivoting said rocker to mesh the aligned gears, and an adjustable stop for each intermediate gear and a rack operable by a gear carried by said rocker frame engages the stop to control the limit of rocker pivoting and the depth of gear mesh.

References Cited in the file of this patent

UNITED STATES PATENTS

| 905,637 | Beskow | Apr. 18, 1911 |
| 989,733 | Townsend | Oct. 24, 1939 |
| 2,344,434 | Wigglesworth | Mar. 14, 1944 |
| 2,978,923 | Carlson | Apr. 11, 1961 |

FOREIGN PATENTS

| 80,457 | Australia | Apr. 10, 1920 |
| 190,693 | Great Britain | Jan. 18, 1923 |

OTHER REFERENCES

Product Engineering, vol. 30, No. 1, Jan. 5, 1959, page 53.